United States Patent [19]

Inque et al.

[11] 3,793,697
[45] Feb. 26, 1974

[54] APPARATUS FOR AUTOMATICALLY ASSEMBLING ANTIFRICTION BEARINGS

[75] Inventors: Takasi Inque; Shinsuke Nagao, both of Iwata; Hiroshi Nakamura, Shizuoka, all of Japan

[73] Assignee: Toyo Bearing Manufacturing Company Limited, Osaka-shi, Japan

[22] Filed: Feb. 29, 1972

[21] Appl. No.: 230,231

[30] Foreign Application Priority Data
Sept. 6, 1971 Japan.............................. 46-69039
Nov. 19, 1971 Japan.............................. 46-92816
Nov. 17, 1971 Japan.............................. 46-108027

[52] U.S. Cl. ................................................ 29/201
[51] Int. Cl............................................. B23p 19/04
[58] Field of Search 29/201, 201 D, 200 R, 148.4 A

[56] References Cited
UNITED STATES PATENTS
3,577,623   5/1971   Ono ...................................... 29/201

Primary Examiner—Thomas H. Eager
Attorney, Agent, or Firm—J. Y. Houghton

[57] ABSTRACT

In an apparatus for automatically assembling antifriction bearings wherein inner and outer rings and rolling elements are assembled together to automatically complete antifriction bearings, an improved apparatus whereby the step of measuring the groove diameters of inner and outer rings and the step of feeding rolling elements to measured inner and outer rings to complete the assembling of antifriction bearings are indepently carried out so that the assembling station is permitted to operate continuously without involving idle motion. A control circuit and a mechanism for withdrawing rolling elements to be used in said apparatus, and other constructional advantages and particulars will be made clear.

6 Claims, 8 Drawing Figures

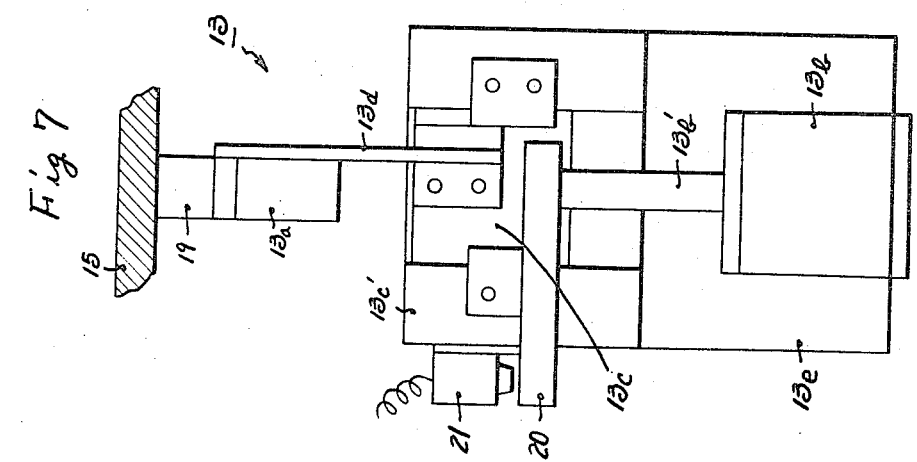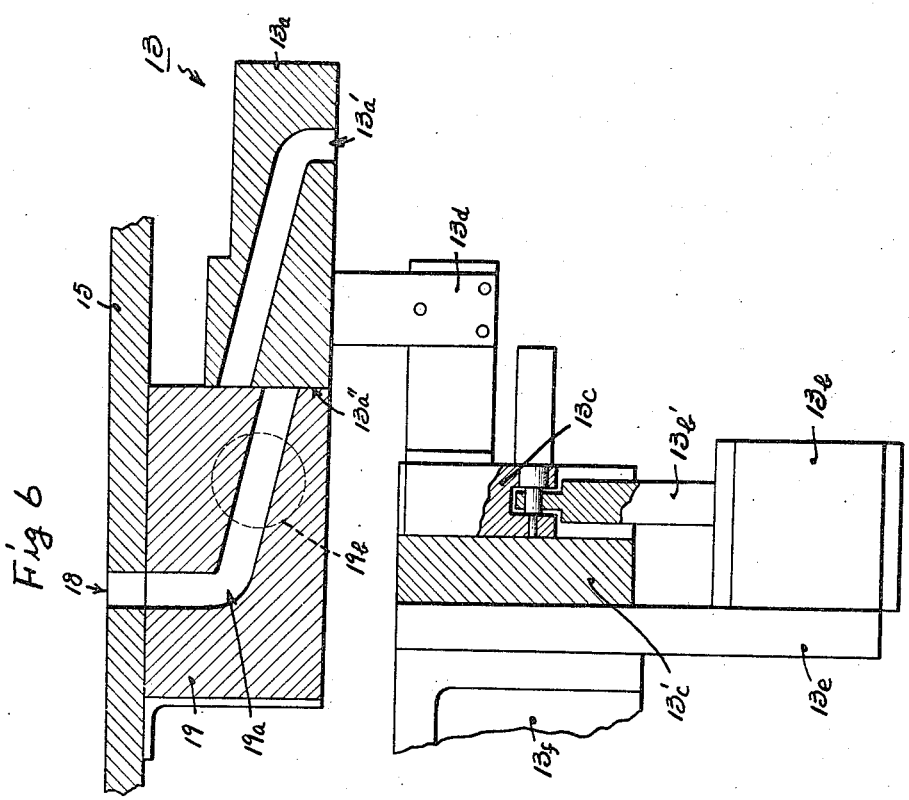

ically assembling antifriction bearings

BACKGROUND OF THE INVENTION a. Field of the Invention

The present invention relates to an apparatus for automatically assembling antifriction bearings wherein inner and outer rings and rolling elements are assembled together to automatically complete the assembling of antrifriction bearings. It also relates to a control circuit and a mechanism for withdrawing rolling elements to be used in said apparatus.

b. Field of the Prior Art

A known apparatus for automatically assembling antifriction bearings is of the system in which the sizes of mutually cooperative groove diameters of a pair of inner and outer rings to be paired together are simultaneously computed by a set of mechanical measuring mechanisms and expressed in terms of a single electric signal, which is then used as a selection indication signal for rolling elements thereby selecting and counting desired rolling elements, the latter being then discharged onto a common receiver dish and when a corresponding article of paired inner and outer rings is transferred to the assembling position, a rod inserted in the single outlet of the receiver dish, i.e. a vertical groove in a filling mechanism and cooperating with assembling means is withdrawn to open said single outlet to fed corresponding rolling elements into a clearance between the inner and outer rings.

Such construction, however, causes serious disadvantages as follows.

Since the common receiver dish does not permit two or more sets of rolling elements to exist therein at the same time, it is only after the rod is at least actuated to discharge rolling elements to the assembling means through the single outlet of the receiver dish and the rod again closes the single outlet that the next rolling elements are discharged onto the receiver dish. Therefore it follows that the preliminary steps of measuring, selecting and counting and the afterstep of assembling are in one-to-one-correspondence working relation. As a result, when there is no rolling element that corresponds to the result of measurements, i.e. when NG occurs, the assembling means is idly operated, causing loss of time. To cite another known apparatus for automatically assembling antifriction bearings, there is U.S. Pat. No. 3,577,623 owned by the present applicant. In this apparatus, sets of rolling elements that have been selected and counted are temporarily fed one after another into a plurality of storage cylinders mounted on a rotary plate that intermittently rotates through an equal angle in harmony with selecting and counting operations, and when pairs of inner and outer rings to be assembled arrive at the assembling part successively in order of measurement taken, of the rolling elements stored in distinct sets within the plurality of storage cylinders of the rotary plate, those elements which correspond to said pairs of inner and outer rings are successively discharged to be fed into respective clearances between outer and inner rings. With this apparatus, however, since selected and counted rolling elements are successively stored in the storage cylinders of the rotary plate, the construction is relatively bulky and requires complicate timed drive means. Further, in such apparatus, the passage for rolling elements is relatively long, having the disadvantage of causing a bruise or other damage to them.

SUMMARY OF THE INVENTION

The present invention has been developed in view of the aforesaid disadvantages of the known apparatus for automatically assembling antifriction bearings. Thus, the invention provides an apparatus for automatically assembling antifriction bearings comprising a measuring part for measuring the difference between the groove diameters of inner and outer rings to determine the size of rolling elements suited for said inner and outer rings prior to assembling, a part whereby when measured inner and outer rings arrive at the assembling position, rolling elements corresponding to said inner and outer rings are fed to said inner and outer rings, and a part for making ready for withdrwal or rolling elements which connects said two parts to each other and includes an electric circuit for memorizing the sizes of rolling elements in order of measurement of inner and outer rings. The invention also provides a control circuit and a mechanism for withdrawing rolling elements to be used in said apparatus.

BRIEF DESCRIPTION OF THE DRAWINGS

FIG. 6 is an enlarged side view in longitudinal section of a rolling element discharging part;

FIG.7 is a front view thereof; and

DESCRIPTION OF THE PREFERRED EMBODIMENT

Figure 1:
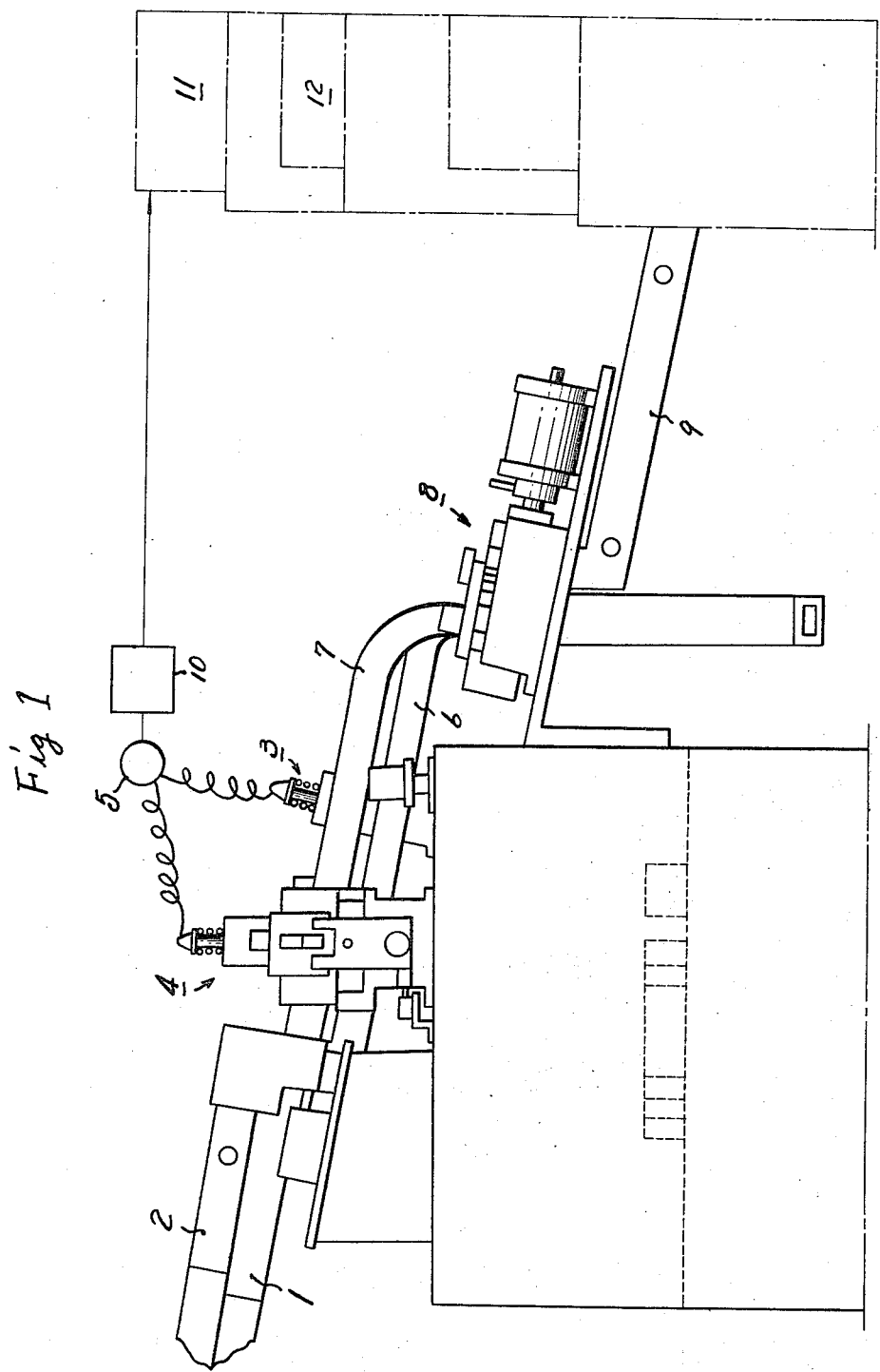
FIG. 1 is a side view of the entire apparatus for automatically assembling antifriction bearings according to the present invention.
Figure 2:
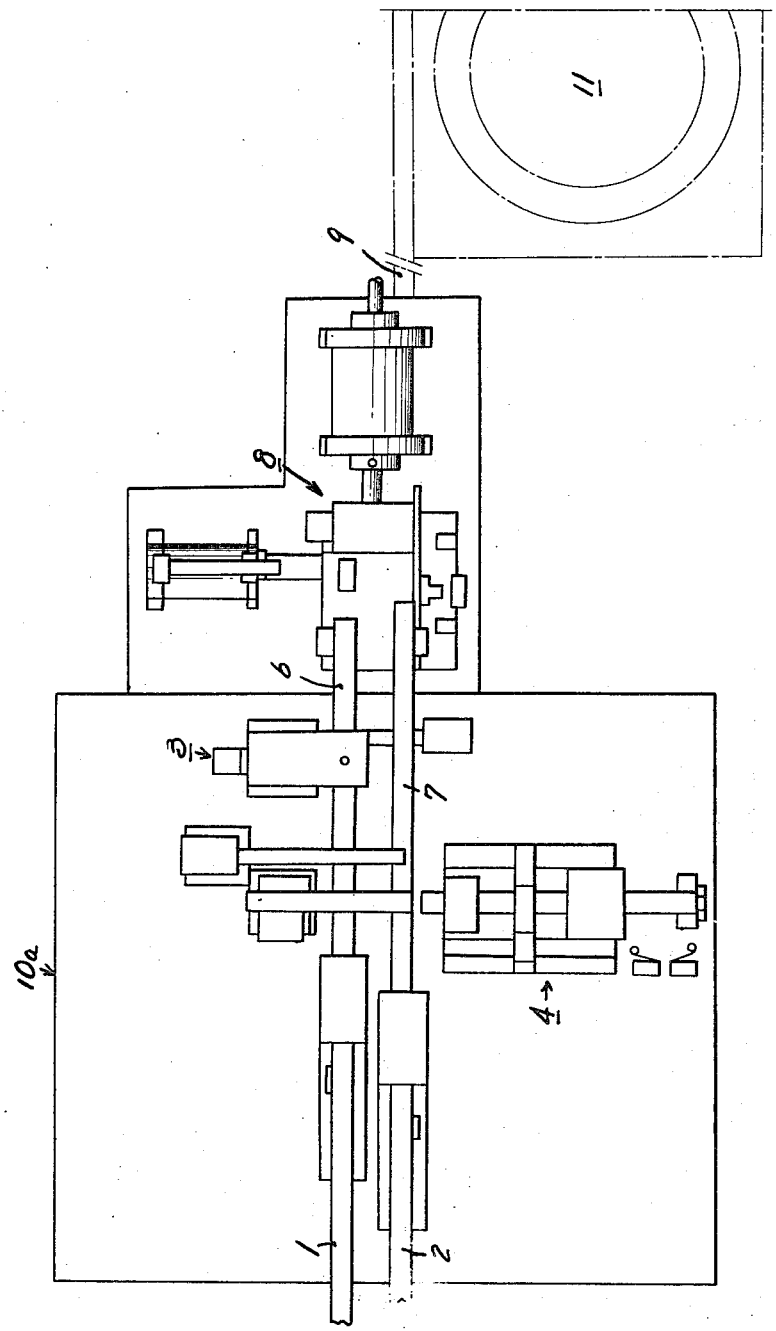
FIG. 2 is a plan view thereof.

FIGS.1 and 2 are explanatory views of an entire apparatus for automatically assembling antifriction bearings according to the present invention. Inner and outer rings roll under their own weight in their respective chutes 1 and 2 reach an inner-ring groove diameter-measuring mechanism 3 and an outer-ring groove diameter-measuring mechanism 4, respectively, the measured values being transmitted to a single arithmetic unit 5. The thus measured inner and outer rings roll under their own weight in chutes 6 and 7 to read an inner and outer-ring pairing mechanism 8 where they are paired together. A predetermined number of such articles each consisting of one inner and one outer ring that have been paired together by said pairing mechanism 8 are pooled in a temporary storage region 9.

On the other hand, when a pair of inner and outer rings to be assembled together have been measured as described above, the resulting electric signals are evaluated by said arithmetic unit 5 which, in turn, produces an electric signal corresponding to the difference between said input electric signals. Such output signals are temporarily memorized as stay signals one in each of a plurality of sets of electric circuits which are designed to memorize said output signals successively in order of measurement taken. This temporary electric memory circuit 10 is provided in an electric panel 10a. The preceding or leading article of pair rings in the temporary storage region 9 reaches a rolling element supply position, where it is given a predetermined eccentric clearance defined between the rings, whereupon a predetermined number of corresponding rolling elements which have been withdrawn from a rolling element storing part 11 by an electric memory signal from the temporary electric memory circuit 10 and are temporarily staying in a temporary stay region 19 are discharged to be fed into an eccentric clearance between the inner and outer rings. Thereafter, bearings are continuously assembled and completed by a suitable mechanism.

FIGS. 3 through 7 illustrate a device for discharging different sizes of rolling elements into the predetermined clearances in the articles of paired inner and outer rings, said device comprising a rolling element storing part 11, a rolling element counting part 12 and a rolling element discharging part 13.

The rolling element storing part 11 has a plurality (k) of rolling element storing boxes 11a each containing a number of rolling elements of a particular size. These rolling element storing boxes 11a are radially arranged on an upper support table 14 and fixed thereon.

The rolling element counting part 12 has the same number (k) of counters 12a as that of said rolling element storing boxes 11a. These counters 12a are radially arranged on a lower support table 15 and independently slidably mounted thereon. Each counter 12a is connected to a driver; e.g. it is connected to the front end of the piston rod 12b' of a cylinder 12 b.

The rolling element counting part 12 is disposed below said rolling element storing part 11. The rolling element storing boxes 11a and the counters 12a are in one-to-one correspondence relation and connected to each other by respective chutes 16 each designed to permit rolling element to pass therethrough in one row. Each rolling element storing box 11a has a movable sleeve 17 disposed around the associated chute 16, said movable sleeve 17 constantly executing vertical reciprocating motion. The vertical reciprocating motion of the movable sleeve 17 aids the rolling elements in the associated storage box 11a in being successively discharged through the associated chute 16.

The lower ends of said chutes 16 are connected to a stationary plate 12c placed on the counters 12 a. The counters 12a are slidable between the lower support table 15 and the stationary plate 12c. Each counter 12a is provided with a vertical groove 12a', the length of which is such that it may receive only a predetermined number of rolling elements therein in one row. Each counter 12a is so designed that when the piston rod 12b of the associated cylinder 12a is in its retracted position, the vertical groove 12a' is in communication with the associated chute 16. Therefore, the rolling elements contained in the chute 16 in one row flow into the vertical groove 12a' of the counter 12a. These cylinders 12b are actuated by an electric memory device to be later described. When a particular counter 12a is advanced by the associated piston rod 12b' upon actuation of the associated cylinder 12b, the predetermined number of rolling elements contained in the verical groove 12a are separated from the rolling elements in the chute 16. It is to be note that the rolling elements in the chute will not fall down since the lower end of the chute 16 is closed by the upper surface of the counter 12a at this time. At a place toward which the counters 12a are advanced, there is a common rolling element supplying port 18, which extends through the lower support table 15 and is positioned at the center of the arrangement of the counters 12a. Fixed to the lower surface of the lower support table 15 is a temporary storage body 19, the purpose of which is to divide the withdrawal path of rolling elements into short sections thereby preventing rolling elements from having a greater acceleration and intertia during rolling down, thus preventing creation of a bruise particularly at the terminal end as a result of strong collision. The temporary storage body 19 is provided with a storage hole 19a communicating with said rolling element supplying port 18. Therefore when any one of said counters 12a reaches the advance end, the predetermined number of rolling elements contained in the vertical groove 12a' are discharged through the rolling element supplying port 18 into the temporary storage hole 19a and stored therein. When the rolling elements are stored in the storage hole 19a, an ascertaining switch 19b is actuated to cause the cylinder 12b to be retracted and returned.

Connected with the temporary storage body 19 for rolling elements is a rolling element discharging part 13 which comprises a rolling element discharging body 13a and a driving means therefor, e.g. a cylinder 13b.

The rolling element discharging body 13a, as shown in FIGS. 6 and 7, is disposed on a lateral side of the termporary storing part 19 and has a rolling element discharging hole 13a'. The rolling element discharging body 13a is integrally connected to a vertically shiftable slide 13c through an arm plate 13d. The slide 13c integrally connected to the piston rod 13b' of a cylinder 13b, so that it is vertically shifted in a slide guide 13c' upon actuation of the cylinder 13b. The slide guide 13c' and cylinder 13b are fixed to a common support plate 13e, which, in turn, is fixedly supported by the aforesaid lower support table 15.

The cylinder 13b, as shown in FIG. 6, is normally held in a position where it projects the piston rod 13b'. Then, the rolling element discharging body 13a is in its upper end position, with its lateral surface 13a'' closing the terminal end of the temporary storage hole 19a. When the cylinder 13b is driven in a manner to be later described, the piston rod 13b is retracted, so that the rolling element discharging body 13a is moved to its lower end position, whereupon the rolling element discharging hole 13a' is aligned with the termporary storage hole 19a to establish communication therewith and the rolling elements temporarily contained in the storage hole 19 are discharged as they roll down under their own weight.

The rolling element discharge body 13a is installed immediately above the rolling element supplying device in the bearing assembly line. That is, immediately below the discharge hole 13a' of the rolling element discharging body 13a, there is disposed a device for defining a predetermined eccentric clearance in an article of inner and outer rings. When this device defines a clearance in an article of inner and outer rings, the cylinder 13b is actuated to cause the predetermined number of rolling elements to be discharged through the rolling element discharging hole 13a' to be fed into said eccentric clearance.

The operation of said cylinder 13b is controlled by a timer or the like so that after lapse of a preset period of time it returns the rolling element discharging body 13a to its upper end position. As the rolling element discharging body returns to its upper end position, a dog 20 actuates a microswitch 21 (see FIG.7). The microswitch 21 serves to produce a signal indicating the completion of discharge of rolling elements.

Figure 5:
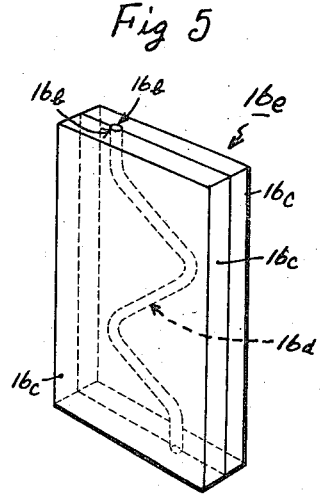
FIG. 5 is a perspective view of another embodiment of a rolling element withdrawing chute.
Figure 4:
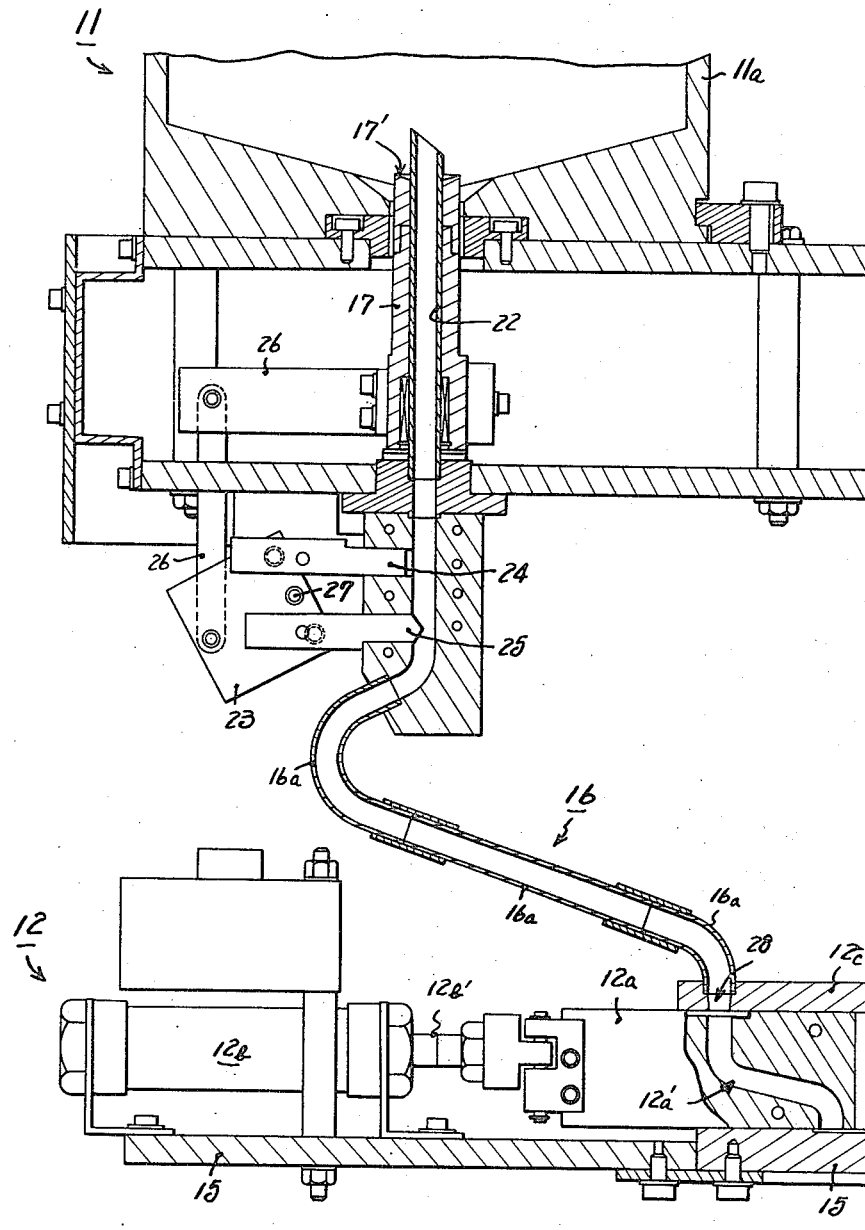
FIG.4 is an enlarged side view, in longitudinal section, showing a rolling element storing part and a counting part.

Reference will now be made to FIGS.4 and 5, wherein the numeral 11 designates the rolling element storing part; 12, the rolling element counting part; and the numeral 16 designates a connecting member (chute) for connecting said rolling element storing part and rolling element counting part.

The rolling element storing part 11, as previously described, has a plurality of rolling element storing boxes 11a provided for different rolling element size classes, each storage box 11a having a withdrawing sleeve 22 attached to the bottom thereof.

Each withdrawing sleeve 22 has a movable sleeve 17 coaxially and loosely fitted thereover. The movable sleeve 17 is constantly moving up and down on the outer side of the withdrawing sleeve 22 so as to guide rolling elements into the withdrawing sleeve 22 by means of a dish-shaped portion 17' formed at the front end. Disposed intermediate between the ends of the withdrawing sleeve 22 are two control rods 24, 25 adapted to be alternately projected and retracted through a link 23. The control rods 24, 25 perform the function of discharging rolling elements in fixed distinct amounts which are to be withdrawn from the withdrawing sleeve 22. In order for the control rods 24, 25 to be operated in conjunction with the up and down movement of the movable sleeve 17, the link 23 is connected to the movable sleeve 17 by a connecting rod 26 so that the up and down movement of said movable sleeve causes the link 23 to be swung around the axis of the pivot 27, thereby causing the two control rods 24, 25 to be alternately projected and retracted.

Connected to the lower end of said withdrawing sleeve 22 is a connecting member 16 consisting of bent pipes 16a through which the withdrawing sleeve communicates with the counting part 12.

The counting part 12 has the same number of counters 12a as that of storage boxes 11a, said counters 12a being adapted to be independently slidable by means of their respective drive means 12b such as cylinders. That is, the counters 12a slide between the support table 15 and the upper plate 12c under the action of said cylinders 12b. The upper plate 12c is provided with a communication hole 28 to which the lower end of the bent pipe 16a is connected.

Each counter 12a is provided with a sloping bent counting hole 12a' which, upon retraction of the associated cylinder 12b, communicates with the communication hole 28 and which, upon projection of said cylinder 12b, communicates with a single common central hole 18 formed in the support table 15.

In the above description, the member 16 for connecting the rolling element storing part 11 and the rolling element counting part 12 has been shown as composed of bent pipes, but, as shown in FIG.5, two plates 16c provided with bent grooves 16b to constitute an intended bent passageway 16a may be put together to provide a member 16e for establishing communication between said rolling element storing part 11 and rolling element counting part 12.

In short, as has been described so far, since a plurality of fixed-quantity-discharging control rods adapted to be alternately projected and retracted are provided intermediate between the ends of the rolling element withdrawing sleeve of a rolling element storing box used for an automatif bearing assembling apparatus and the rolling element storing box is communicated with the associated counter by a connecting member having a gently sloping bent passageway, it is possible to assure gentle withdrawal of rolling elements, precluding the possibility of rolling elements being strongly hit due to a vertical head, etc. and thereby protecting rolling element from being damaged, and to automatically and continuously release precision rolling elements of high quality.

The arrangement of the electric memory part 10 will now be described.

Figure 8:
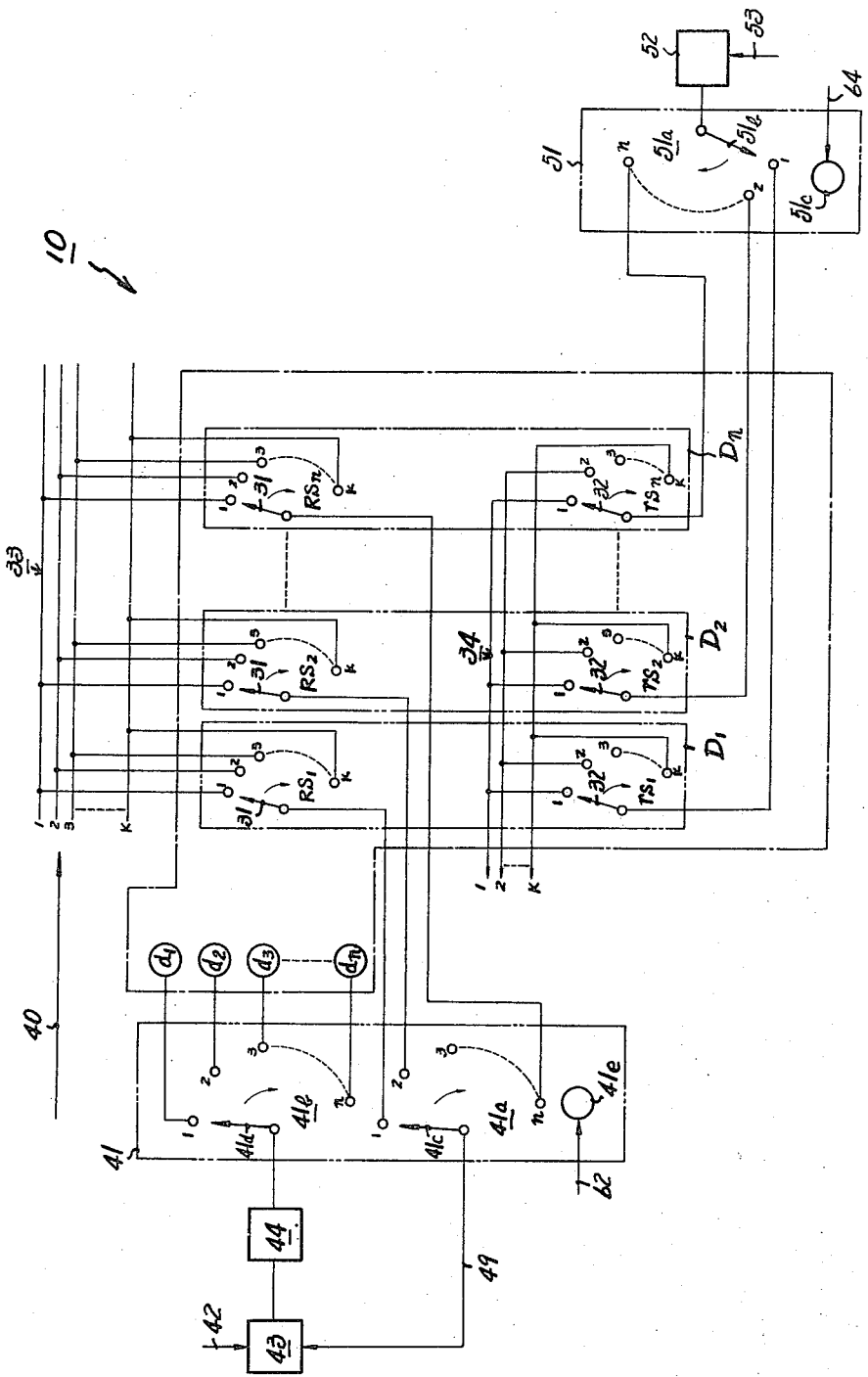
FIG.8 is a view showing an electric control circuit.

As shown in FIG.8, the electric memory part 10 comprises a plurality of memory element circuits $D_1 \ldots D_n$, a memory circuit-switching circuit 41, a memory-recalling circuit 51, and an assembling and assembling-preparation connection circuit 52. The memory element circuits $D_1 \ldots D_n$ are provided with two operatively connected rotary switches $RS_1 \ldots RS_n$ and $rs_1 \ldots re_n$, respectively. Each of these two rotary switches consists of the same number, $k$, of fixed contacts ①, ② .. ⓚ as that of size-classes of rolling elements, and a single slide 31, 32. The $k$ fixed contacts ①, ② .. ⓚ of the rotary switches $RS_1$, $RS_2 \ldots RS_n$ are respectively connected to $k$ rolling element size-class signal lines 33, and their sliders 31 are respectively connected to the $n$ fixed contacts ①, ② .. ⓝ of one rotary switch 41a of the memory circuit-switching circuit 41.

Further, the $k$ fixed contacts ①,② .. ⓚ of the other rotary switches $rs_1$, $rs_2 \ldots rs_n$ are respectively connected to the $k$ lines 34 of $k$ operative circuits which actuate said cylinders 12b of the rolling element counting part 12, and their sliders 32 are respectively connected to the $n$ fixed contacts ①, ② .. ⓝ of the rotary switch 51a of of the memory-recalling circuit 51.

The memory circuit-switching circuit 41 has two operatively connected rotary switches 41a and 41b. Each of the rotary switches 41a and 41b has the same number of fixed contacts ①, ② .. ⓝ as that of memory element circuits $D_1 \ldots D_n$, and a single slider 41c, 41d. The n fixed contacts of one rotary switch 41a, as described above, are respectively connected to the sliders 31 of the rotary switches $RS_1 \ldots RS_n$. The n fixed contacts ①, ② .. ⓝ of the other rotary switches are respectively connected to driving coils $d_1 \ldots d_n$ for the rotary switches of the memory element circuits $D_1 \ldots D_n$.

Whenever a pair of inner and outer rings to be assembled are measured by the inner-ring groove diameter measuring mechanism 3 and outer-ring groove diameter measuring mechanism 4, the arithmetic unit 5 emits a signal 40 corresponding to a selected size-class. The signal 40 flows through a corresponding one of the rolling element size-class lines 33, e.g. the $k^{th}$ line. These rolling element size-class lines are in one-to-one correspondence relation to the size classes of the rolling elements in the rolling element storing part.

Further, in synchronism with said signal 40, a selection period signal 42 is emitted, whereby a gate 43 is opened to actuate an oscillator circuit 44. The oscillator circuit 44 is connected to the slider 41d of the rotary switch 41b. The actuation of the oscillator circuit 44 produces a pulse current corresponding to the oscillating frequency, said current flowing into the driving coil $d_1$ through the fixed contact ① selected by the slider 41d. As a result, the sliders 31 and 32 of the rotary switches $RS_1$ and $rs_1$ of the memory element circuit $D_1$ corresponding to the driving coil $d_1$ are rotated and advanced. When the slider 31 reaches the contact ⓚ corresponding to the live line k of the rolling element size-class lines 33, the rotary switch 41a is energized so that the gate 43 is closed by a signal 49. Thereby the operation of the oscillator circuit is stopped. That is, rotary switch $rs_1$ of the memory element circuit $D_1$ one cycle of memory operation is completed with the memorizing the fixed contact ⓚ. Upon completion of the memory operation, a timer (not shown) is operated in conjuction of the signal 49 of the rotary switch 41a, and after lapse of the preset period of time a memory circuit-switching signal 62 is produced. This signal 62 actuates the driving coil 41e of the memory circuit-switching circuit 41 to advance the sliders 41c and 41d by one step. However, in the case where the selection size-class signal 40 emitted from the arithmetic unit 5 does not correspond to any one of the size-classes of rolling elements, there is no current flowing through any of the rolling element size-class lines 33 and hence the memory operation ends in vain. Therefore, said signal 62 is not produced, and the emission the selection period signal 42 is stopped after the lapse of preset period of time.

Next, when a signal is emitted again from the arithmetic unit 5, the memory is impressed on the next memory element circuit $D_2$ in a manner similar to that described above. Thereafter, similar operations are repeated till the $n^{th}$ memory element circuit $D_n$ is operated. In short, the memory circuit-switching circuit 41 and the memory element circuits $D_1 \ldots D_n$ successively perform operations for memorization of the sizes of rolling elements in accordance with the measurement of inner and outer rings.

Figure 3:
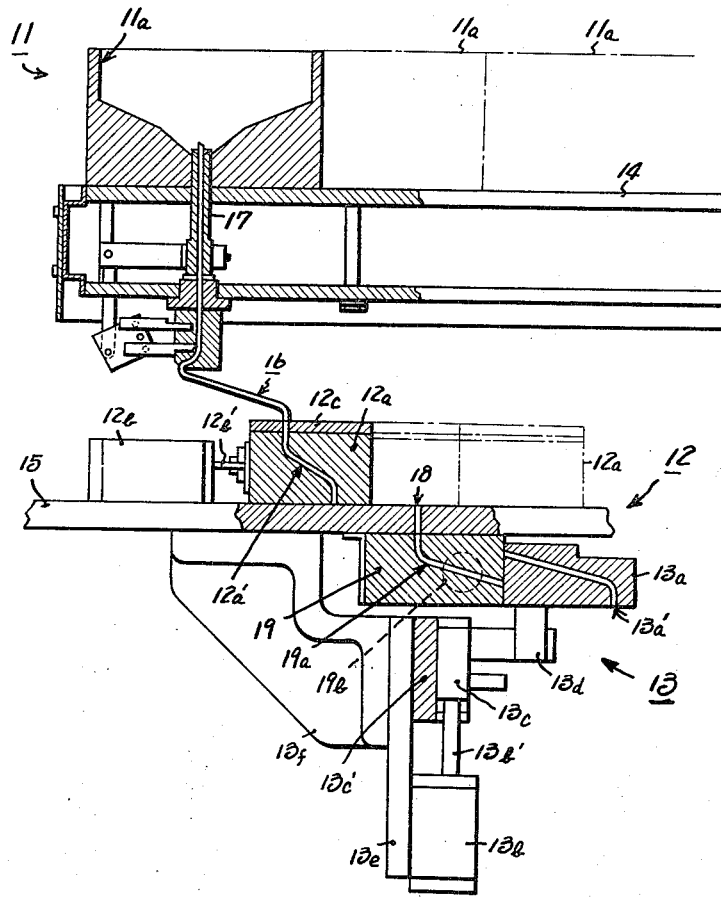
FIG. 3 is a side view, in longitudinal section, of a rolling element supply preparation part.

As for the assembling of inner and outer rings, when a predetermined eccentric clearance is defined between the inner and outer rings, the cylinder 13b shown in FIG.6 is actuated to cause the rolling elements contained in the temporary storage hole 19a to be fed into said clearance. When said cylinder 13b is returned, the microswitch 21 is actuated to transmit the signal 53 to the gate 52 of the memory-recalling circuit 51 shown in FIG.8 to open said gate, whereby through the fixed contact ① which has been selected by the slider 51b of the rotary switch 51a, the memory held by the rotary switch $rs_1$ of the memory element circuit $D_1$ corresponding to said fixed contact ① is recalled. Thus, as a result, through the fixed contact ⓚ which has already been selected by the slider 32 of the rotary switch $rs_1$, that one of the lines 34 which corresponds to said fixed contact ⓚ, i.e. the line k is energizes. Thereby the corresponding one of the driving cylinders 12b for the counters 12a in the counting part 12 in FIG. 3 is driven, so that a set of rolling elements of the size-class corresponding to the memory is fed into the tempory storage hole 19a for rolling elements. Upon completion of feeding of rolling elements into said storage hole 19a, a step signal 64 is transmitted to a driving coil for the memory recalling circuit 51 whereby the slider 51b is advanced one step.

Next, when the pair of inner and outer rings are fed to the assembling position and a predetermined eccentric clearance is defined therebetween, the cylinder 13b shown in FIG.6 is actuated again, so that the rolling elements in the storage hole 19a are discharged to be fed into the eccentric clearance between the inner and outer rings. Thereafter the aforesaid operations are repeated.

In short, as soon as the assembling of the preceding pair of inner and outer rings and rolling elements is completed, the memory-recalling circuit 51 performs the function of discharging and feeding rolling elements corresponding to a succeeding pair of inner and outer rings in order of registration of memory in the memory element circuit $D_1 \ldots D_n$ before said succeeding pair arrives at the assembling position.

The memorizing operation corresponding to the measurement of inner and outer rings and the discharging and feeding operation of rolling elements corresponding to the assembling of said inner and outer rings do not interfere with each other.

As for the erasion of the memories in the memory elements $D_1 \ldots D_n$, they are automatically erased by the fact that memorization is performed again.

As has been described so far, the present invention comprises a plurality of memory circuits for successively memorizing the sizes of rolling elements correspondingly to the measurement of inner and outer rings, a memory circuit-switching circuit, a memory-recalling circuit for discharging rolling elements into a primary storge region successively in order of registration of memories in said memory circuits prior to the assembling operation of rolling elements, and an assembling and assembling-preparation connection circuit which, when a pair of inner and outer rings arrive at the assembling position, discharges rolling elements corresponding to said pair into a clearance between said inner and outer rings from a single discharging part and which, before the succedding pair of inner and outer rings arrive at the assembling position, discharges the succeeding set of rolling elements into said temporary storage region through communication with said memory-recalling circuit. Since, of the aforesaid circuits, the memory circuits and the memory-recalling circuit are adapted to operate under different cycles, the assembling of bearings can be continuously carried aut without being restricted by measuring operation and hence the assembling operation efficiency can be greatly increased.

Whiles there have been described herein what are at present considered preferred embodiments of the several features of the invention, it will be obvious to those skilled in the art that modifications and changes may be made without departing from the essence of the invention.

It is therefore to be understood that the examplary embodiments thereof are illustrative and not restrictive of the invention, the scope of which is defined in the appended claims and that all modifications that come within the meaning and range of equivalency of the claims are intended to be included therein.

We claim:

1. An apparatus for automatically assembling antifriction bearings comprising a measuring part which, prior to assembling, measures the difference in the groove diameters of inner and outer rings and determines the size of rolling elements suited for said inner and outer rings, a part which when a measured pair of inner and outer rings arrive at the assembling position, feeds within said measured pair rolling elements corresponding to said measured pair, and an electric memory part which interconnects said two parts and actuates the rolling element feeding part in order of registration of memories by the assembling operation of inner and outer rings.

2. An apparatus for automatically assembling anti-friction bearings as set forth in claim 1, characterized in that a part which, prior to the assembling of inner and outer rings and rolling elements, permits at least a set of rolling elements corresponding to said inner and outer rings to temporarily stay therein, and is installed in a portion of the rolling element feeding part.

3. An apparatus for automatically assembling anti-friction bearings as set forth in claim 1, characterized in that a part which, prior to the assembling of inner and outer rings and rolling elements, permits at least a set of rolling elements corresponding to said inner and outer rings to temporarily stay therein, and a means connected to said part which, when paired inner and outer rings arrive at the assembling position, is actuated to discharge and feed rolling elements corresponding to said inner and outer rings into a clearance between said inner and outer rings, and are installed in a portion of the rolling element feeding part.

4. An apparatus for automatically assembling anti-friction bearings as set forth in claim 1, characterized in that the part for feeding rolling elements to inner and outer rings comprises a plurality of rolling element storing boxes for containing rolling elements in accordance with different specified size classes, a plurality of rolling element withdrawing and counting means which are installed so as to respectively correspond to said rolling element storing boxes and which, after the completion of assembling of the preceding inner and outer rings, are selectively actuated to carry out withdrawing operation in accordance with the memories in the electric memory part for rolling elements corresponding to the succeeding inner and outer rings, a part which is adapted to be connected to said rolling element withdrawing and counting means through a single rolling element discharging hole provided therein and permit at least a set of rolling elements to temporarily stay therein, a means which is connected to the last-mentioned part and which is actuated upon arrival of said succeeding inner and outer rings at the assembling position to discharge and feed rolling elements corresponding to said inner and outer rings into a clearance between said inner and outer rings.

5. An apparatus for automatically assembling anti-friction bearings as set forth in claim 4, characterized in that said rolling element withdrawing and counting means comprises a plurality of fixed-quantity discharging control rods installed intermediate between the ends of the rolling element withdrawing sleeve of each rolling element storing box, and a connecting member having a gently sloping bent passageway for connecting said rolling element storing box and a counter associated therewith, thereby preventing rolling elements from being damaged.

6. An apparatus for automatically installing antifriction bearings as set forth in claim 1, characterized in that said electric memory part comprises a plurality of memory circuits for successively memorizing the size classes of rolling elements corresponding to inner and outer rings correspondingly to the measurement of said inner and outer rings, a memory circuit-switching circuit for effecting switching of the memory circuits each time a memory operation is completed, a memory-recalling circuit which selects and actuates only one rolling element counter in accordance with the memories in said memory circuits after the completion of the assembling operation of preceding inner and outer rings, feeds a set of rolling elements corresponding to succeeding inner and outer rings into a temporary storage part, and erases the memory in the memory circuit after feeding, and an assembling and assembling-preparation connection circuit which, when said succeeding inner and outer rings arrive at the assembling position, discharges and feeds rolling elements corresponding thereto from the temporary storing part through a single discharging hole into a clearance between said inner and outer rings, and actuates said memory recalling circuit to feed rolling elements corresponding to succeeding inner and outer rings into the temporary storage part immediately after discharging and feeding and before said succeeding inner and outer rings arrive at the assembling position.

* * * * *